V. ROYLE.
Wash-Tub Stools.
No. 155,978. Patented Oct. 13, 1874.
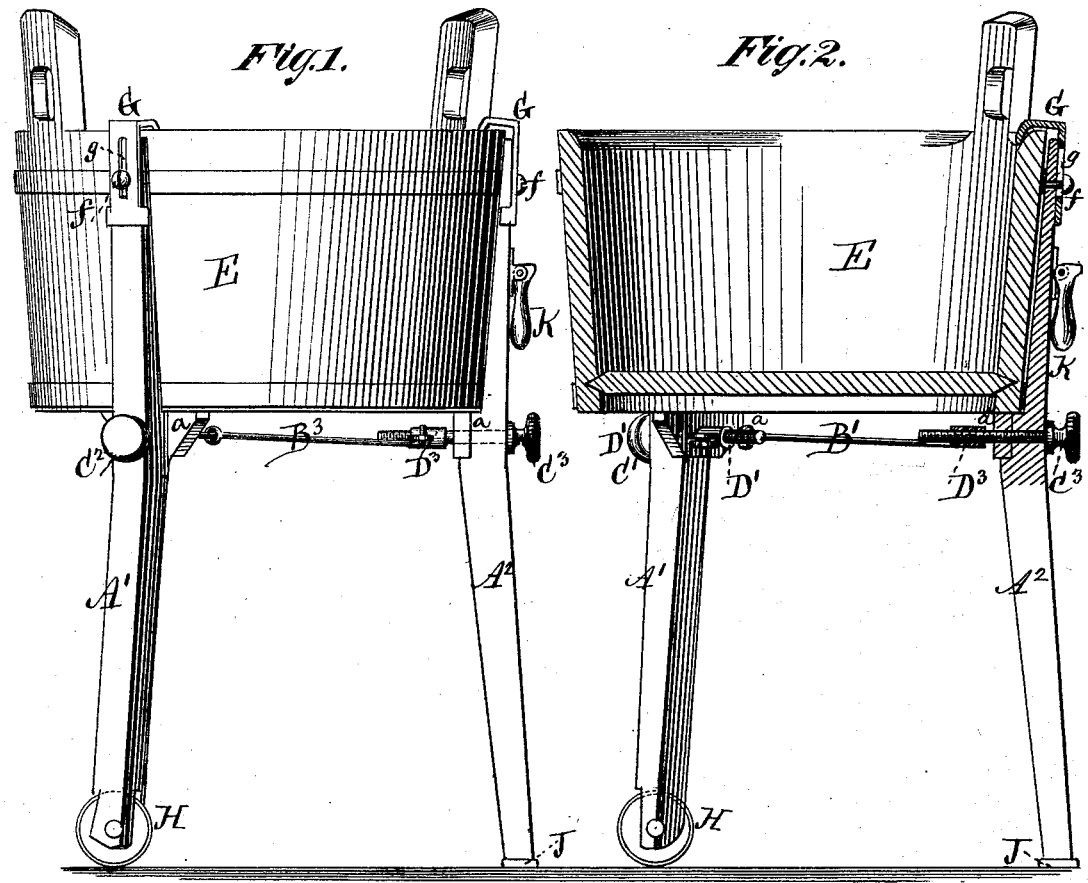
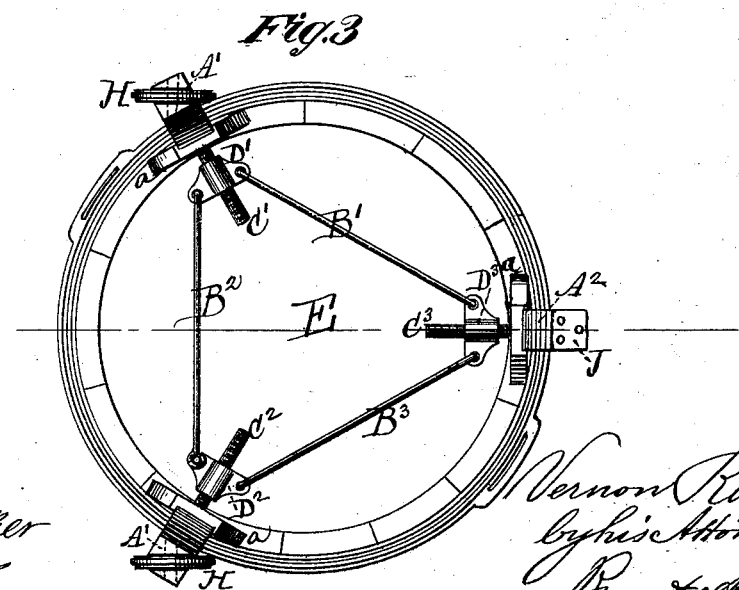

UNITED STATES PATENT OFFICE.

VERNON ROYLE, OF PATERSON, NEW JERSEY.

IMPROVEMENT IN WASH-TUB STOOLS.

Specification forming part of Letters Patent No. 155,978, dated October 13, 1874; application filed September 3, 1874.

*To all whom it may concern:*

Be it known that I, VERNON ROYLE, of Paterson, in the county of Passaic and State of New Jersey, have invented an Improved Wash-Tub Stool, of which the following is a specification:

My invention consists in a wash-tub stool of novel tripod construction, whereby it may be readily adjusted to tubs of different sizes, and as readily taken apart and placed out of the way when not in use, and whereby, also, provision is made for easily moving it from place to place when holding the tub.

In the accompanying drawing, Figure 1 is a side view of my invention applied to a tub. Fig. 2 is a vertical section of the same. Fig. 3 is a bottom view.

The stool is composed of three legs, $A^1$ $A^1$ $A^2$, connected by rods $B^1$ $B^2$ $B^3$, thumb-screws $C^1$ $C^2$ $C^3$, and nuts $D^1$ $D^2$ $D^3$, formed with ears or lugs. The upper portions of the three legs are alike, being formed with shoulders $a$, upon which rest the bottom of the tub E, and the upper ends being furnished with hooks or clamps G, for engagement with the upper edge of the tub.

The shoulders $a$ may be formed by sawing a piece from each leg, or by attaching a block thereto.

The upper ends of the legs may, if desired, be passed through loops or staples attached to the hub; but I prefer to use the clamps or hooks shown herein, or others of similar construction.

The hooks or clamps G are formed of metal, with their upper ends turned over so as to grasp the edge of the tub, and with lugs at the lower ends for engagement with the sides of the legs, to prevent lateral displacement. Each clamp is attached to the leg by means of a set-screw, $f$, passing through a slot, $g$, so that the clamp may be adjusted up or down, to correspond with tubs of different sizes. The feet or lower ends of the legs $A^1$ $A^1$ are provided with wheels or rollers H, so arranged, with relation to each other, that when the legs are attached to the tub the wheels are parallel with each other.

The foot of the leg $A^2$ may, if desired, be provided with a rubber or other elastic sole or pad, J. The leg $A^2$ is provided with a handle, K, arranged to hang down out of the way when not in use.

The rods $B^1$ $B^2$ are attached to the nut $D^1$ by eyes at one end of each rod, engaging with the perforations in the ears or lugs on said nut. The opposite end of the rod $B^1$ has a hook formed on it for engagement with a perforation in one of the lugs of the nut $D^3$, and the corresponding end of the rod $B^2$ has an eye formed on it for engagement with a pin or stud on one of the lugs of the nut $D^2$. The remaining rod, $B^3$, has an eye formed on one end, by which it is attached to one of the lugs of the nut $D^2$, and a hook on the other end, for engagement with a perforation in the remaining lug of the nut $D^3$ in the same manner as described in reference to the rod $B^1$.

By this arrangement of the rods, the legs are sure to be properly placed in position, so that the rollers H H will run parallel with each other, as the rods will not match with the nuts in any other than such proper position.

The thumb-screws $C^1$ $C^2$ pass through the legs $A^1$ $A^1$, and engage with the nuts $D^1$ $D^2$; and the thumb-screw $C^3$ passes through the leg $A^2$, and engages with the nut $D^3$.

When the rods are adjusted in their engagement with the nuts, the thumb-screws are turned so as to draw the nuts toward the legs, and tighten the rods in their engagement with the nuts, and brace the legs so as to cause them to form a firm support for the tub.

By the use of a stool constructed according to my invention, the tub may be readily moved from place to place by grasping the handle K and lifting the leg $A^2$ from contact with the ground, and moving the stool along on the wheels H H.

When the leg $A^2$ rests on the ground it keeps the stool steadily in place, and prevents the wheels from moving.

What I claim as new, and desire to secure by Letters Patent, is—

1. The combination, in a wash-tub stool, of legs $A^1 A^1 A^2$, having shoulders $a$ and adjustable clamps G, with the rods $B^1 B^2 B^3$, and their thumb-screws and nuts, substantially as described.

2. A wash-tub stool, in which the legs are provided with shoulders for supporting the tub, and with adjustable clamps for grasping the edge of the tub, in combination with adjusting-rods, substantially as described.

VERNON ROYLE.

Witnesses:
 FRED HAYNES,
 MICHAEL RYAN.